United States Patent [19]

Smelser

[11] 4,434,748
[45] Mar. 6, 1984

[54] WATER INJECTION CONTROL VALVE

[76] Inventor: Bernard C. Smelser, 12812 New Windsor Rd., Union Bridge, Md. 21791

[21] Appl. No.: 372,303

[22] Filed: Apr. 27, 1982

[51] Int. Cl.³ ............... F02M 25/02; F02D 19/00
[52] U.S. Cl. ..................... 123/25 L; 123/25 A; 123/25 C; 123/25 J
[58] Field of Search ............ 123/25 L, 25 J, 25 K, 123/25 C, 25 A

[56] References Cited

U.S. PATENT DOCUMENTS

| | | | |
|---|---|---|---|
| 2,591,272 | 4/1952 | Littlejohn et al. | 123/25 L |
| 3,196,606 | 7/1965 | Cholvin et al. | 123/25 J |
| 4,064,842 | 12/1977 | Sherrill | 123/25 L |
| 4,286,550 | 9/1981 | Lewis | 123/25 L |
| 4,329,945 | 5/1982 | Beech et al. | 123/25 L |

Primary Examiner—Ira S. Lazarus
Attorney, Agent, or Firm—Brady, O'Boyle & Gates

[57] ABSTRACT

Water under pressure is delivered to an air/fuel induction passage of an internal combustion engine under control of a three-way spool valve whose water conveying passages are completely isolated from actuating air passages by dynamic elastic seals on the valve spool. The valve is spring-biased to a water bypass position and is activated by engine manifold pressure to deliver water when the engine is running.

5 Claims, 6 Drawing Figures

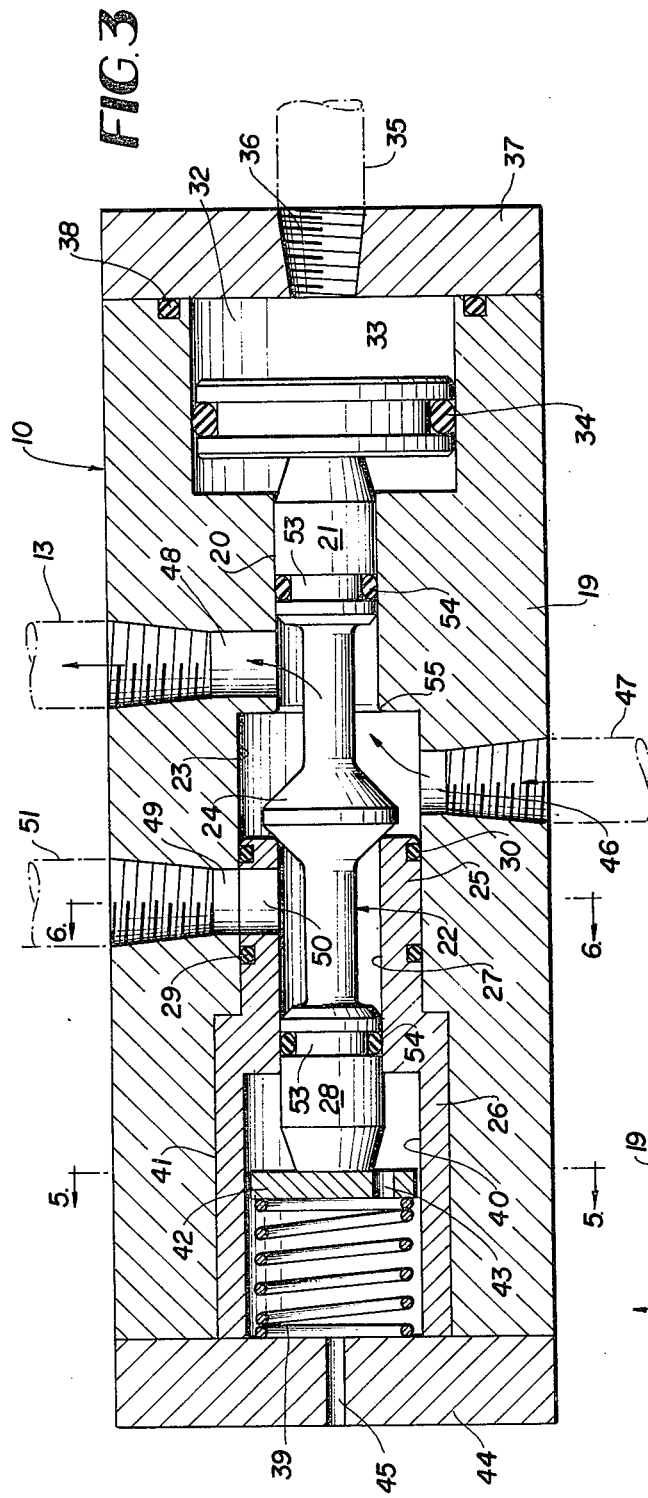
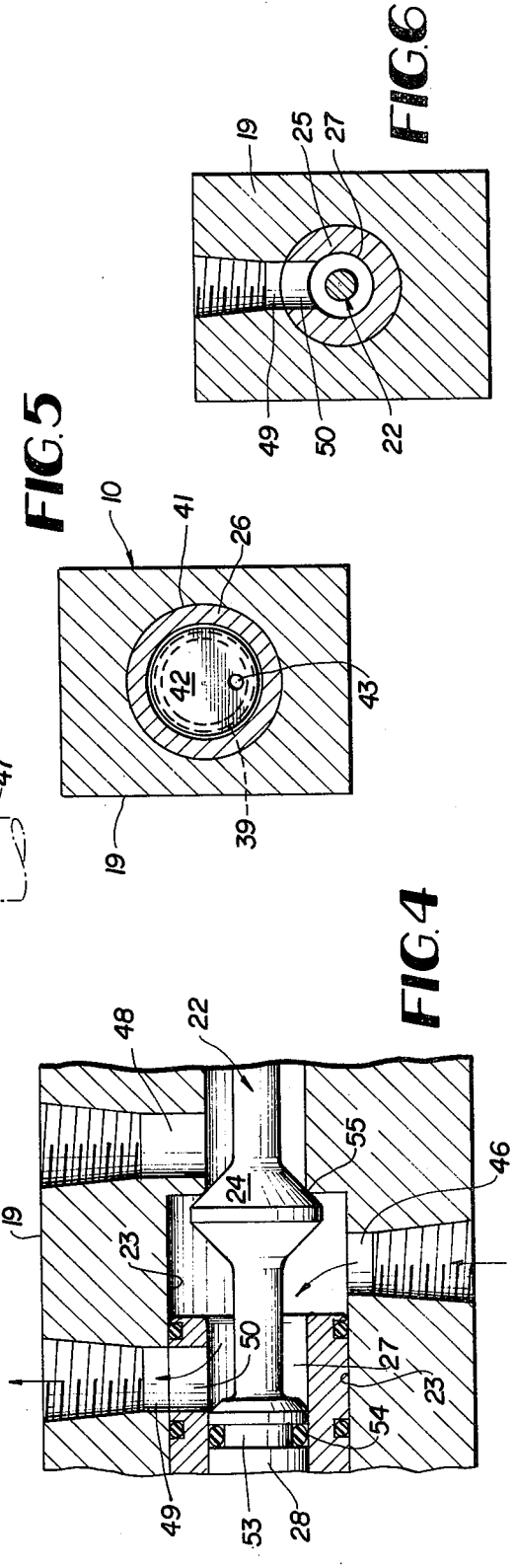
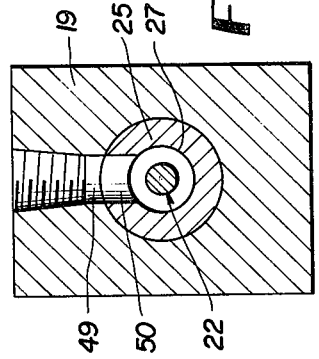

WATER INJECTION CONTROL VALVE

BACKGROUND OF THE INVENTION

The delivery of water in controlled minute amounts to internal combustion engines to retard and control combustion and improve engine operation is an old expedient disclosed in numerous prior patents. Such devices have met with varying degrees of acceptance and success. They vary widely in complexity and manufacturing costs and, in general, are either too simple to operate efficiently and effectively or too costly to be practical.

With the above in view, it is the object of this invention to provide a water delivery or injection system for engines which is uncomplicated and of relatively low manufacturing cost and which has the ability to operate effectively on demand under varying conditions of engine operation.

The heart of the invention resides in the provision of a three-way spool valve which is activated by engine manifold pressure and responds directly to the degree of such pressure through a suitable booster device to deliver exactly the proper amount of water to the air/fuel induction passage of the engine to satisfy engine demand at any given instant. The valve spool is spring-biased to a water bypass position, such as low idle, where little or no water is delivered through the valve to the engine. When the engine is shut off, no water can be delivered through the valve.

The valve is direct and positive in its control of water delivered to the engine and the water passages in the valve cooperating with the valve spool are dynamically sealed effectively from adjacent air actuation chambers of the valve. The valve is versatile in that it may be used to regulate the admission of water to a wide variety of engines for the purposes stated in the prior art.

Other features and advantages of the invention will become apparent during the course of the following description.

BRIEF DESCRIPTION OF THE DRAWINGS

FIG. 3 is an enlarged central vertical section taken on line 3—3 of FIG. 2, with the valve fully actuated to deliver water.

FIG. 4 is a fragmentary section similar to FIG. 3 showing the valve in the biased bypass position.

FIG. 5 is a transverse vertical section taken on line 5—5 of FIG. 3.

FIG. 6 is a similar section taken on line 6—6 of FIG. 3.

DETAILED DESCRIPTION

Figure 1:
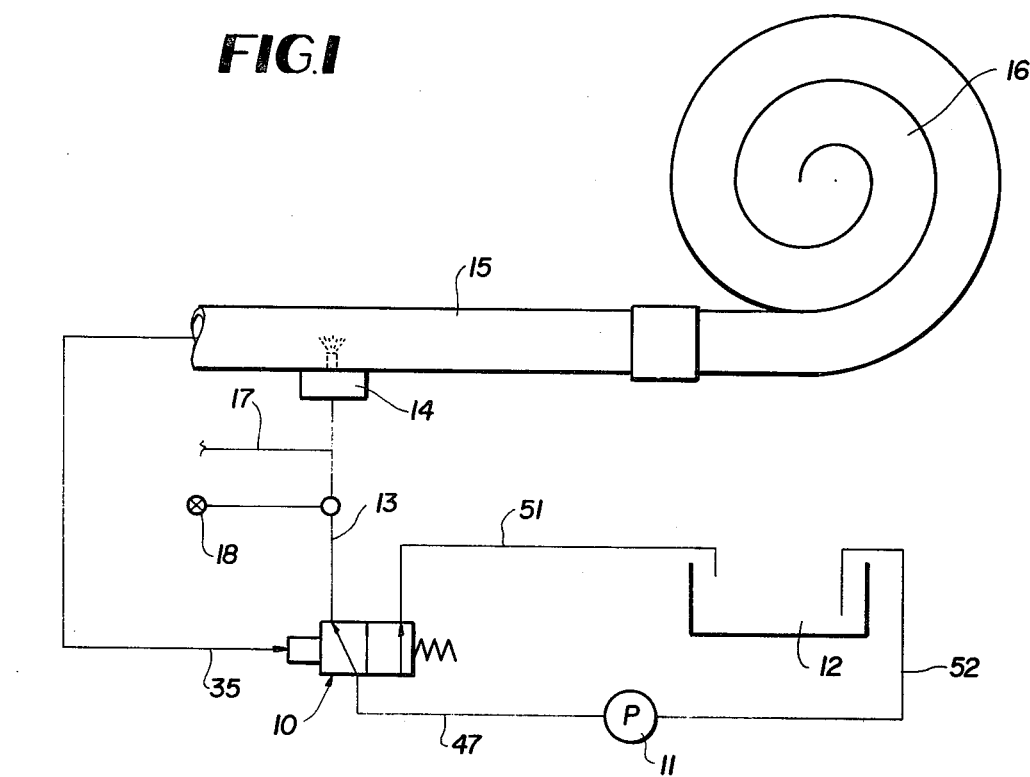
FIG. 1 is a schematic view of a water delivery system for internal combustion engines embodying the valve in accordance with the invention.
Figure 2:
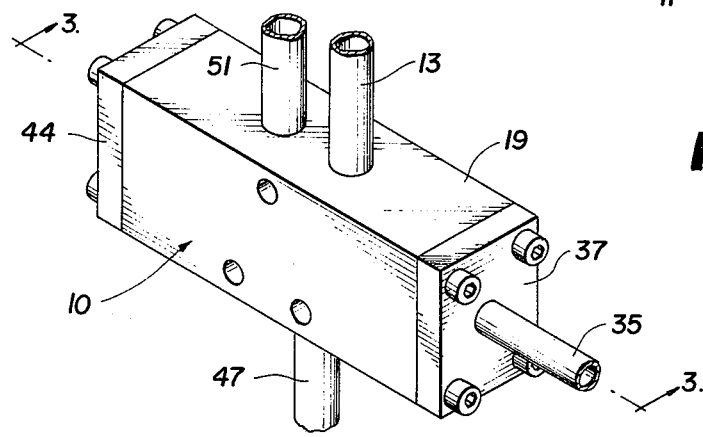
FIG. 2 is a perspective view of the valve.

Referring to the drawings in detail wherein like numerals designate like parts, a three-way valve 10 receives pressurized water from a suitable pump 11 which in turn draws water from a reservoir 12. In one position of the value, namely its activated position shown in FIG. 1, the valve routes the water through a line 13 to a nozzle assembly 14 coupled in an air/fuel induction conduit 15, such as an intake manifold, leading to engine combustion chambers. The engine may utilize a blower or supercharger 16 in some cases. A branch water line 17 from the line 13 may lead to a second stage nozzle in the conduit 15 further downstream toward the combustion chamber. One or more water nozzles may be utilized. A pressure-responsive indicator light 18 connected in the line 13 may be provided to indicate when water under pressure is being delivered to the engine. The system shown in FIG. 1 may be installed on various types of internal combustion engines and only an illustrative embodiment of the system has been shown.

Figure 7:
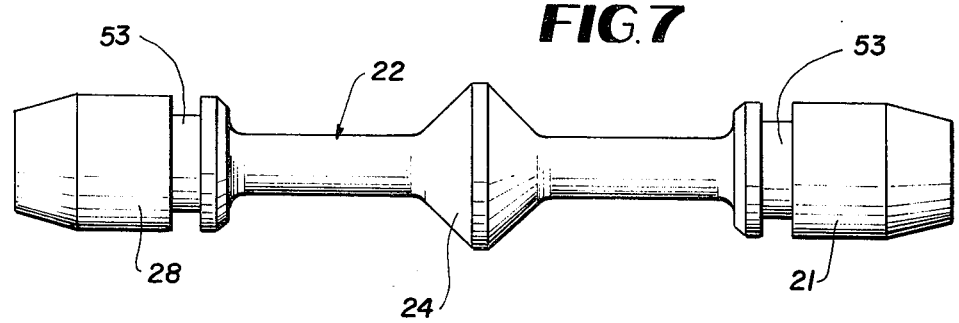
FIG. 7 is a side elevation of the valve spool.

The valve 10, which contains the essence of the invention, comprises a block or body 19 having a central longitudinal bore 20 sized to receive one cylindrical end portion 21 of a valve spool 22 shown in detail in FIG. 7. The bore 20 leads inwardly to an enlargement 23 coaxial therewith receiving a dual tapered head 24 at the longitudinal center of the valve spool and snugly receiving a smaller diameter extension 25 of a stationary valve sleeve 26 whose bore 27 receives another cylindrical end portion 28 of the spool 22 therein. A pair of static elastic ring seals 29 and 30 are placed in annular grooves formed in the sleeve extension 25 on opposite sides of the bypass port 49 to preclude water leakage around the sleeve 26 at all times.

The bore 20 leads outwardly in the valve body to a substantially enlarged cylindrical chamber 32 receiving a valve actuating floating piston 33 sealed to the bore of chamber 32 by a dynamic elastic ring seal 34. The piston 33 drives the spool 22 in response to air pressure against it delivered through a line 35, such as a booster line, connected with the engine intake manifold. The booster line 35 is connected into a threaded opening 36 provided in a valve body cover plate 37 at one end of the valve body 19 sealed by an elastic ring seal 38.

Positive air pressure is delivered by the booster line 35 to piston chamber 32 by a conventional booster device of any well-known type which responds to vacuum pressure in the engine intake manifold or conduit 15. As the manifold vacuum increases with engine demand for a greater fuel charge, the booster device, not shown, delivers air at correspondingly increased pressure to the chamber 32 to drive the piston 33 against the valve spool 22 to shift it toward the water admitting full open position shown in FIG. 3 of the drawings.

The spool 22 is opposed in its axial movement caused by piston 33 by a compression spring 39 within the bore 40 of sleeve 26, the sleeve being held in a surrounding bore 41 of valve body 19 considerably larger than the bore portion 23.

One end of the spring 39 abuts a floating retainer plate 42 in the bore 40 having an air vent opening 43. The outer end of the spring abuts an end cover plate 44 of the valve body having a central air vent port 45.

The valve body has a center water inlet port 46 coupled with a water supply line 47 leading from the pump 11, FIG. 1. The inlet port 46 leads into the bore portion 23 of the valve body which communicates directly with the bore 20 and with an outlet water port 48 leading from the latter and into the water delivery line 13 leading to the nozzle assembly 14 which is coupled into the port 48. A water bypass port 49 is also provided in the valve body on the other side of inlet port 46 in registration with an opening 50 in sleeve extension 25 which opening communicates with the sleeve bore 27. The bypass port 49 is coupled with a bypass line 51 leading from the valve 10 to the reservoir 12. Another line 52 connects the reservoir 12 with the inlet of pump 11.

The valve spool end portions 21 and 28 have grooves 53 provided therein receiving dynamic elastic ring seals 54. These two seals are very important elements of the invention as they serve to completely separate and isolate the internal water passages of the three-way valve from its activating air passages defined by chamber 32 and bore 40, etc.

The dual tapered surfaces of center spool head 24 can engage the end face of sleeve extension 25, FIG. 3, when the valve is delivering water to the engine through port 48, the bypass port 49 then being blocked, and can engage an annular shoulder 55 in the valve body when water is being bypassed, FIG. 4, through the port 49 to return line 51 while the delivery port 48 is blocked. FIG. 3 shows the valve spool 22 fully displaced by piston 33 against sleeve extension 25 representing maximum engine demand for fuel and water. FIG. 4 shows the condition where the engine is shut off or at very slow idle and the biasing spring 39 is displacing spool 22 fully in the opposite direction against the shoulder 55 so that no water is being delivered to the engine air/fuel conduit 15. The valve 10 has the ability to respond automatically to all intermediate engine demand conditions for fuel and water between slow idle and wide open throttle, and in this respect the valve differs from all known prior art control devices used on water admission systems for engines. More particularly, the spool head 24 can locate itself at any required intermediate position between the two ports 48 and 49 so that smaller or greater amounts of water may pass through the same simultaneously in response to any degree of demand from the engine. All of this takes place without any external control, manual or otherwise. The spool 22 will always seek a balanced position between the force exerted by biasing spring 39 and a particular degree of positive air pressure exerted on the outer side of piston 33 responsive to a given condition of engine operation. The system is simple, highly reliable and results in the delivery of precisely the desired amount of water to the conduit 15 by the control valve for all varying engine operating conditions.

The device has a fail-safe capability in the sense that, whenever the engine stops running, the valve cannot deliver water to the engine as it is spring-biased to the water bypass condition.

It is to be understood that the form of the invention herewith shown and described is to be taken as a preferred example of the same, and that various changes in the shape, size and arrangement of parts may be resorted to, without deparing from the spirit of the invention or scope of the subjoined claims.

I claim:

1. In a water admission system for a combustion engine having a fuel charge induction passage subject to pressure variations as a result of engine demand variations, a water delivery valve means including a driver connected with said induction passage, and cooperative water delivery means coupled to the valve means and including a connection with the induction passage and operable to deliver varying amounts of water from a reservoir to the induction passage in response to varying engine demand for fuel through the induction passage, said valve means further comprising a three-way valve including a water inlet passage, a bypass passage, and a water delivery passage communicating with said water delivery means, a biased shiftable valve element normally blocking communication between the water inlet and delivery passages and establishing communication between the water inlet and bypass passages, said water delivery means including delivery nozzle means connected in said induction passage, the water delivery passage being in communication with said delivery nozzle, and said driver comprising a pressure responsive element in a chamber of said valve connected with said induction passage and acting directly on the shiftable valve element to move it against a biasing force for such element varying distances as engine demand varies.

2. In a water admission system as defined in claim 1, and said shiftable valve element comprising a valve spool having a head thereon between the ends of the spool and between the water delivery and bypass passages, opposing seats for said head between the water delivery and bypass passages, and the head being adapted to progressively restrict the flow of water from the water inlet passage to the water delivery and bypass passages responsive to movements of the valve spool initiated by the biasing force or said pressure responsive element.

3. In a water admission system as defined in claim 2, and said head comprising a head having opposite end conical surfaces which taper in opposite directions axially of said spool.

4. In a water admission system as defined in claim 2, and said pressure responsive element in said chamber being a piston in direct engagement with one end of said spool, and a compression spring at the other end of said spool in another chamber of said valve variably resisting movement of said spool by said piston.

5. In a water admission system as defined in claim 4, and a pair of dynamic elastic seals on opposite end portions of said spool on opposite sides of said head and isolating the water inlet, delivery and bypass passages of the valve from said chambers holding said piston and said spring.

* * * * *